US012769531B2

(12) United States Patent
Gray et al.

(10) Patent No.: US 12,769,531 B2
(45) Date of Patent: Oct. 20, 2026

(54) SENSOR PLATFORM

(71) Applicant: MeshComm Engineering LLC, Loveland, CO (US)

(72) Inventors: Nathan Gray, Johnstown, CO (US); Nathan Schram, Littleton, CO (US); Thomas Preston Hollis, Johnstown, CO (US)

(73) Assignee: MeshComm Engineering LLC, Loveland, CO (US)

( * ) Notice: Subject to any disclaimer, the term of this patent is extended or adjusted under 35 U.S.C. 154(b) by 433 days.

(21) Appl. No.: 18/526,688

(22) Filed: Dec. 1, 2023

(65) Prior Publication Data

US 2024/0370247 A1 Nov. 7, 2024

Related U.S. Application Data

(60) Provisional application No. 63/429,811, filed on Dec. 2, 2022.

(51) Int. Cl.
*G06F 8/61* (2018.01)

(52) U.S. Cl.
CPC .................................... *G06F 8/61* (2013.01)

(58) Field of Classification Search
CPC ................ G06F 8/60; G06F 8/61; G06F 8/65
See application file for complete search history.

(56) References Cited

U.S. PATENT DOCUMENTS

| | | | | |
|---|---|---|---|---|
| 9,015,378 | B2 * | 4/2015 | Le Grand | G06F 11/3476 710/53 |
| 11,539,796 | B2 * | 12/2022 | Padiyar | G06N 10/00 |
| 2012/0215652 | A1 * | 8/2012 | Melvin | G06Q 30/06 705/26.1 |
| 2014/0094122 | A1 * | 4/2014 | Etemad | H04W 76/10 455/41.2 |
| 2015/0347114 | A1 * | 12/2015 | Yoon | H04L 12/2832 717/176 |
| 2017/0242674 | A1 * | 8/2017 | Hussein | H04L 67/12 |

* cited by examiner

*Primary Examiner* — Marina Lee
(74) *Attorney, Agent, or Firm* — Craig R. Miles; CR MILES P.C.

(57) ABSTRACT

A sensor, sensor platform, and related methods that can combine low-cost satellite and cellular communications to enable a seamless deployment with direct sensor-to-cloud access even if a cellular network is not present during deployment. A user is able to deploy the sensor and it will connect to a cellular network if available or to a satellite if a cellular network is not available. Also provided are over-the-air software update and installation capabilities and a user space for installing custom applications from an application repository.

20 Claims, 4 Drawing Sheets

SENSOR PLATFORM

RELATED U.S. APPLICATION DATA

This application claims priority to U.S. provisional application No. 63/429,811 filed on Dec. 2, 2022, which is hereby incorporated by reference in its entirety.

SUMMARY OF THE INVENTION

Various embodiments of the invention provide a single board solution for handling sensor interfaces combined with satellite and cellular communications. The sensor device can be deployed where power is not available using a battery and optionally a solar panel for recharging. Alternatively, the same solution can be used where mains power is present to process large amounts of data quickly over the specified networks to be aggregated and analyzed in the cloud and displayed in a customer-specific dashboard. Embodiments can integrate a wide variety of remote sensors with multiple modes of power and across multiple network types to deliver reliable, real-time data for critical applications.

Systems, apparatuses, and methods in accordance with embodiments of the invention are described herein. Some embodiments provide a system comprising a plurality of sensor devices associated with a customer, wherein each sensor device is configured to wirelessly transmit a message comprising sensor data. In some embodiments, the system further comprises a plurality of messaging queues comprising a first messaging queue associated with the customer that is configured to receive messages from the plurality of wireless sensor devices; and a second messaging queue associated with the customer that comprises data derived from one or more messages in the first messaging queue. In some embodiments, the system further comprises a plurality of connectors associated with the customer, wherein each connector is configured to receive messages from one of the plurality of messaging queues. In some embodiments, the system further comprises a plurality of customer platforms associated with the customer, wherein each customer platform can receive sensor data from one of the plurality of connectors. In some embodiments, each of the sensor devices comprises a processor, a memory, and a dual-band cellular-satellite chipset. In some embodiments, each of the sensor devices is configurable using a short-range wireless protocol. In some embodiments, each of the sensor devices is configured to be updated over the air.

In some embodiments, the system further comprises an application repository configured to provide a plurality of custom applications that are remotely installable on the plurality of sensor devices. In some embodiments, each of the plurality of sensor devices is configured to wirelessly receive and install a custom application from the application repository in a predetermined memory space. In some embodiments, the custom application comprises one or more of a compiled binary file and a script. In some embodiments, the custom application analyzes stored sensor data to generate augmented sensor data. In some embodiments, the augmented sensor data is included in the message. In some embodiments, the message is used to generate a customer alert that is transmitted to a customer platform.

In some embodiments, the system further comprises an application repository configured to provide a plurality of custom applications that are installable on a cloud computing device. In some embodiments, the custom application that is installable on a cloud computing device comprises one or more of a compiled binary file and a script. In some embodiments, the custom application that is installable on a cloud platform analyzes sensor data to generate augmented sensor data. In some embodiments, the augmented sensor data is included in a second message that is transmitted to one of the messaging queues. In some embodiments, the second message is used to generate a customer alert that is transmitted to a customer platform.

In some embodiments, each messaging queue is hosted on a virtual machine. In some embodiments, the virtual machine is in communication with an application repository configured to provide a plurality of custom applications that are remotely installable on at least one of the plurality of sensor devices and a cloud computing device. In some embodiments each sensor device comprises an analog to digital converter. In some embodiments, each sensor device is configured for continuous power optimization using an analog to digital converter to read battery power levels. In some embodiments, each sensor device is configured to use CAT-M1 and NB-IoT protocols. In some embodiments, each sensor device is loaded with multiple cellular provider network profiles on a single eSIM card. In some embodiments, each sensor device is configured to use a cellular signal as the primary communications link and a satellite signal as a secondary communications link. In some embodiments, the messages from the first and second messaging queues are combined and transmitted to a single connector. In some embodiments, the system further comprises a stored permission that allows the customer to receive messages or data derived from messages associated with one or more of other customers. In some embodiments, the stored permission corresponds to a subscription. In some embodiments, the data stored on a sensor device is encrypted using a key derived from one or more hardware identifiers from the sensor device. In some embodiments, the system further comprises a third messaging queue associated with the customer that includes data replicated from the first messaging queue.

In one exemplary embodiment, a system comprises a plurality of sensor devices associated with a customer, wherein each sensor device comprises a processor, a memory, and a wireless transceiver, and wherein the processor is configured to: cause the wireless transceiver to wirelessly transmit a message comprising sensor data; cause the wireless transceiver to wirelessly receive a custom application; install the custom application in a predetermined memory space; and run the custom application to analyze stored sensor data and generate augmented sensor data for inclusion in a second message. In this exemplary embodiment, the system further comprises an application repository configured to wirelessly provide the custom application to each sensor device based on a first customer permission. In this exemplary embodiment, the system further comprises a plurality of messaging queues comprising: a first messaging queue associated with the customer that is configured to receive messages from the plurality of wireless sensor devices; and a second messaging queue associated with the customer that includes data derived from one or more messages in the first messaging queue. In this exemplary embodiment, the system further comprises a plurality of connectors associated with the customer, wherein each connector is configured to receive messages from one of the plurality of messaging queues. In this exemplary embodiment, the system further comprises a plurality of customer platforms associated with the customer, wherein each customer platform can receive data from one of the plurality of connectors.

Some embodiments provide a method of monitoring an environment comprising: detecting a value (e.g., a numerical value, range, condition, input, output, presence or absence of any predetermined input or output) using a sensor device associated with a customer; generating sensor data in response to the detected value; generating a message comprising the sensor data; transmitting the message from the sensor device to at least one messaging queues associated with the customer, wherein the messaging queues are located in a cloud platform; providing the message from at least one of the plurality of messaging queues to one or more of a plurality of connectors; and providing the message to a customer platform associated with the customer.

One of skill in the art will understand that any feature, element, or characteristic of any embodiment of the invention can be used or combined with any feature, element, or characteristic of any other embodiment of the present invention. Unless otherwise expressly stated, it is in no way intended that any method or embodiment set forth herein be construed as requiring that its steps or actions be performed in a specific order. Accordingly, where a method, system, or apparatus claim for example does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of embodiments described in the specification.

BRIEF DESCRIPTION OF THE DRAWINGS

The accompanying drawings, which are incorporated in and constitute part of this specification, illustrate embodiments of the invention, and together with the description, explain the principles of various embodiments of the invention. The embodiments described in the drawings and specification in no way limit or define the scope of any embodiment or claim of the present invention.

Figure 1:
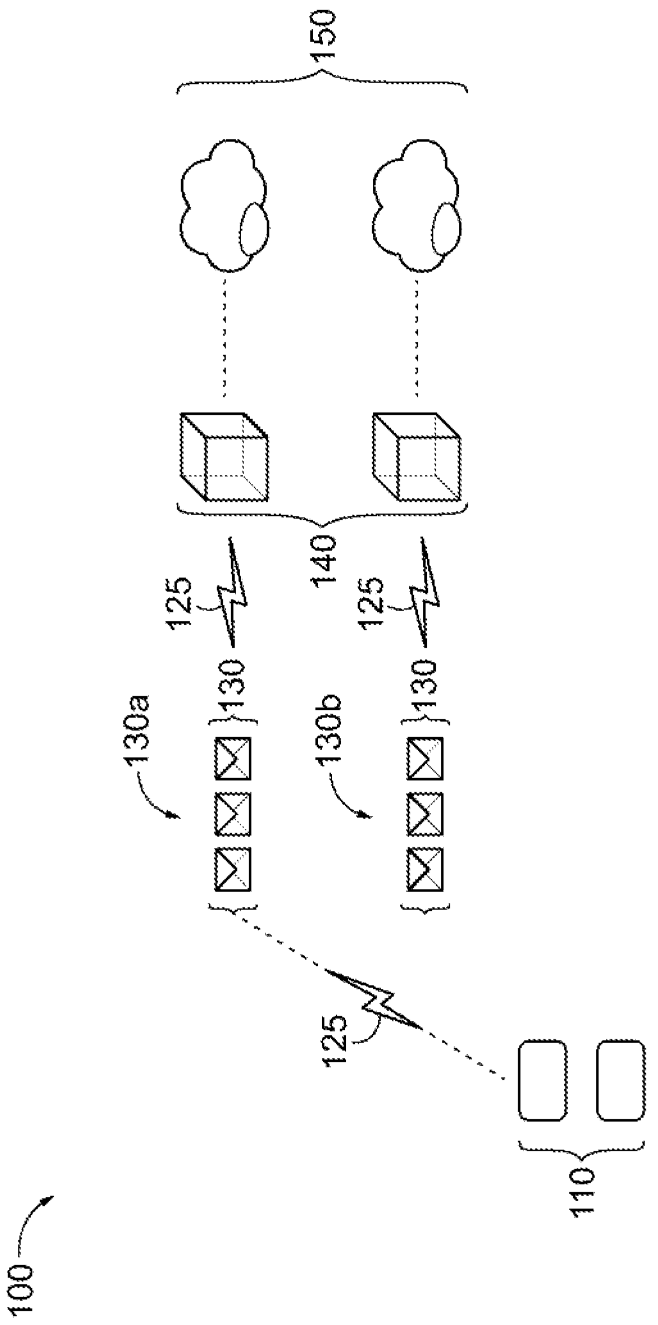
FIG. 1 is an overview of the architecture of a system according to an embodiment of the invention.

The embodiments of the invention have been illustrated in all respects to be illustrative rather than restrictive. For example, a person skilled in the art will understand that the elements in the drawings are not limited to the specific dimensions shown, but are for illustrative purposes only. Those skilled in the art will further realize that the embodiments of the present invention are capable of many modifications and variations without departing from the scope of the present invention.

DETAILED DESCRIPTION OF THE INVENTION

Wireless access to sensor data is tricky. Coverage is at best spotty. There isn't a single provider you can depend on to be anywhere you need to be. You can potentially deploy your own infrastructure if the area you need covered is relatively small, but for any applications that cover large land areas, mobile applications, or include large bodies of water (including oceans), this quickly becomes impractical. Applications such as monitoring watersheds, water tables around key geographic features, flash flood warning systems, soil erosion, monitoring along roads and bridges prone to washouts (coastal regions and many others) all suffer from the lack of contiguous coverage. Cellular signal isn't everywhere, and it is complicated by the fact that there are multiple competing providers and having service with one provider does not guarantee that you can connect to another provider. Most satellite solutions are expensive and bulky making them available in only a small number of deployments with cost being the limiting factor. Lora/NB-IoT deployments are cost prohibitive since you must lease land and tower space to expand deployments.

Embodiments can solve several problems simultaneously. By utilizing the latest Release 17 3GPP standard which enables the use of the NB-IoT standard for Non-Terrestrial Networks (NTN) (i.e., satellite communications) we can now use a standard cellular chipset that supports CAT-M1 and NB-IoT to communicate on both cellular and satellite networks. For example, embodiments of the sensor device and platform can include a multi-purpose SoC that communicates via CAT-M1 and NB-IoT for NTN communications. Additionally, small antenna size reduces size, complexity, and cost of the solution. Embodiments can provide multi-sim profiles/loading multiple cellular network provider profiles onto a single eSIM. This allows embodiments of the invention to operate on many networks without being limited to the coverage of a single network. Embodiments can also provide a low-power sensor device that can power the communications and sensor power requirements from small rechargeable battery and solar solution, such as a solar panel. The data collected by the sensor device can be transported via satellite or cellular communications to the disclosed cloud platform which can utilize MQTTS and AMQP protocols for sensor device to cloud platform communications, or other suitable wireless telecommunications protocols. All communications can be SSL secured using TLS 1.3 (MQTTS, AMQPS, etc.). Data stored on the sensor device and cloud platform can be secured using common encryption methods, such as by AES 256 bit encryption. The cloud platform can enable the ability to setup one or more messaging queues to move data to any customer platform that is needed, for example with the use of a broker, such as the RabbitMQ platform. These messaging queues can be highly integrated into the sensor device, and the cloud platform and data lake to enable increased functionality. This increased functionality can include: (1) the ability to capture and collect data through a sensor device that includes onboard processing of critical time sensitive data; (2) the ability to route critical data and alerts directly to customer systems; (3) the ability to provide analytics on the sensor device, which can serve as a collection endpoint, and in the cloud platform, whereby the analytics can provide alerts and actionable data to the customer through a management console or push this information back into the queues directly to a customer platform; and (4) the ability to manage custom applications that can run on the sensor device or in the cloud platform to perform specific types of analysis or alerting. The custom applications can be downloaded from the application repository.

Data collected by the sensor device can be augmented by other datasets on the Internet, for example, real-time weather data. Embodiments can collect data from a plurality of connected sensors and systems. The sensor device provides specific architecture to support data collection and processing at the edge of the hardware and in the cloud. The sensor device is also capable of processing and transmitting the collected data directly to the cloud. The sensor device provides the physical ability to interface with a multitude of external systems and sensors, for example, via CAN Bus, Ethernet, Bluetooth, RS-485/422/232, SDI-12, GPIO and others. This also includes the basic communication interfaces, such as satellite, Wi-Fi, and cellular. Cellular connectivity is controlled by a multi International Mobile Subscriber Identity (IMSI) SIM card, which allows the device to connect to multiple networks, thereby maximizing the ability to connect via cellular.

The sensor device can comprise an ARM M33 32-bit microprocessor with 512 mKB flash memory and can be paired with an embedded cellular/satellite chipset to handle the communications to/from remote areas. There can be 4×4-20 mA, 4×0-5V spring-loaded terminal with 16-bits of resolution, which can allow the sensor hardware to connect up to 8 external sensors simultaneously. There can be a single SDI-12 to UART converter that allows the user to also connect a legacy sensor. There can be a 2-wire FDCAN interface that directly connects to spring loaded terminals for communication over the CAN bus. There can be 4× protected digital inputs with −100V reverse voltage protection and +27V over voltage protection. There can be 4× open drain outputs that allow the user to connect additional outputs such as form C relays for extended functionality. Both the digital inputs and outputs can also be connected via spring loaded terminals which do not require the use of screwdrivers, allowing technicians to connect up and install the unit quickly and seamlessly. The sensor device can have 4 MB of onboard EEPROM capable of both storing configuration data as well as sensor data storage in the event of LOS (loss of signal) from cellular or satellite, allowing time critical measurements to be safely kept between data exchange to/from the cloud. The sensor device can have a built-in micro-SD card slot to allow the user to insert an SD card of various sizes (commonly used sizes include 16 GB, 32 GB, 64 GB & 128 GB). This can allow the sensor device to be configured to data log extensive amounts of information as a backup to the network for either post-processing for trends or archival for historical comparisons.

Embodiments of the disclosed sensor device have the unique ability to be powered from a 6-30V DC power supply, 5V from USB (USB A to USB micro) and/or a 3.7V single cell lithium-ion battery that can be charged from any of the previously mentioned DC supplies in addition to a 5 W solar panel. Embodiments can have an onboard boost converter to generate 12V required by various sensors from either the 3.3V or 5V (the difference being 500 mA or 800 mA respectively based on the input power). The sensor device can utilize MPP (maximum power point tracking) for optimal efficiencies for the solar charging applications. The battery voltage, the solar panel voltage, and a battery "gas gauge" can be monitored by a 16-bit analog to digital converter to allow for continuous power optimization for ultimate battery longevity. There can be a low power UART interface designed to be the main way to configure the product for its various applications as well as update any system parameters that need to be tuned from the manufacturing process to handle board-to-board variability. Additionally, embodiments can have built in Bluetooth version 5.0 to be used for sensor device configuration via an application from either an Android or Apple device. This allows the user direct access to view instantaneous readings, view trends, update configurations, manually push or pull to/from the cloud and a host of other access to the sensor device without physically contacting it.

Further embodiments of the disclosed sensor device can be constructed as follows: standard Isola FR408HR 6-layer, 4 layer/2 plane design that implements LoRa; 8 layer, 6 signal/2 plane ARM M33 design with expanded I/O; copper weights are 1 oz; the layer stack can be fabricated in a single lamination with no micro vias to allow for high yield through the manufacturing process. Further embodiments of the disclosed sensor device can comprise the following: Arm® Cortex® A7 based CPU @ 792 MHz i.MX 6ULL Micro-Processor; DDR3L SDRAM; 512 MB eMMC Flash; a high-speed CAN bus, a low-speed CAN bus, a flexible data-rate CAN bus; a digital input: a 12V digital output at 500 mA; a 3-axis accelerometer±2/±4/±8/±16 g full scale; 3-axis gyroscope±125/±250/±500/±1000/±2000 degrees per second; a 3-axis magnetometer up to ±50 gauss magnetic dynamic range; CAT-M1 cellular that can also have satellite capabilities (3GPP Rel 17 capable); Wi-Fi 802.11 a/b/g/n hotspot and client mode with WPA2 feature; Bluetooth v5.0 BR/EDR/LE; GPS/GLONASS/BeiDou/Galileo; Internal Lithium-ion Polymer (LIP) 3.7V 1500 mAh with 12V-36V.

Further embodiments of the disclosed sensor device can be constructed as follows: the sensor device microcontroller unit can be manufactured by ST Microelectronics (ARM M33), a 144-pin variant with Trust Zone, DSP and a maximum operating frequency of 110 MHz. The cellular data/satellite chipset can be manufactured by Quectel and utilize the Qualcomm BG9205 chipset. This device is commonly known as the BG77. The 16-bit ATOD (analog to digital converter) can be manufactured by Microchip and can be sigma delta converters in a 14-pin SOIC package. Level translators (TXS0108EPWR) can be manufactured by Texas Instruments and can be used to shift the voltage levels of the signals for communication between the ARM and the BG77. The MPP tracking solar charger (SPV1040TTR) and high efficiency battery charger (L6924UTR) can both be manufactured by ST Microelectronics. The boost converter (LTC3122EMSE #PBF) can be manufactured by Analog Devices to create the 12V power rail (500 or 800 mA) from either the 3.3V or 5V respectively. The SDI-12 to UART can be designed from COTS components. The EEPROM (M95M04-DRMN6TP) can be manufactured by ST Microelectronics. The Bluetooth v5 module (BLUENRG-M2SP) can be manufactured by ST Microelectronics. The USB to UART (CP2102N-A02-GQFN24R) can be manufactured by Silicon Labs and used as the primary data exchange to the LPUART interface. All ICs can either be leaded (SOIC) or leadless (QFN), there are no BGAs in the design. All components can work harmoniously in one integrated product and can be designed into the hardware. Only population/depopulation control of all ICs are present, and the software load can determine if they are accessible/configurable in a given case.

The sensor device according to further embodiments may have one or more of the following features: Cellular data exchange; Satellite data exchange; Backend integration into the cloud via MQTTS or similar; AWS deployment of clusters for data collection/exchange; 4-20 mA sensor reading via 16-bit ATOD (analog to digital converter); 0-5V sensor readings via 16-bit ATOD (analog to digital converter); SDI-12 to UART sensor readings (legacy devices); Access to EEPROM for configuration of settings and storage of manufacturing parameters; Bluetooth integration to configure/read data from Android/iOS device; Digital output control (tested by form C relays off the open drains); Micro SD read/write to allow data logging; 2× dual row 0.1"

female headers bring 4× digital inputs and 4× digital outputs from the MCU for expansion capabilities; 2×1.8V, 3.3V and 5V pins allow for multiple voltage configurations to peripherals; 2×I2C interfaces on the expansion headers; RS-485 to UART or similar interface on the expansion card with backend conversion to I2C; temperature/humidity/pressure sensor with I2C interface; solid state relays for high current applications (form C or the like).

The sensor device, platforms, and methods of the embodiments can also be used for telematics. By way of example, the telematics platform can have one or more of the following features: Wi-Fi data exchange; cellular data exchange; satellite data exchange; backend integration into the cloud via, for example, MQTTS or similar protocol; AWS deployment of clusters for data collection/exchange; digital input; CAN Bus interfaces; Ethernet data exchange; access to configuration of settings and storage of manufacturing parameters, which can be encrypted; Bluetooth integration to configure/read data from an Android or Apple device and connected to Bluetooth sensors; digital output control; and EMMC read/write to allow data logging.

Once the data is transmitted from the sensor device to the cloud platform, the data needs to be routed to multiple sources. Certain critical data and alerts, as defined by the customer depending on the particular application, are routed directly to the users' systems. Data can also be routed to a cloud database where analytics can be performed on the data. This system of messaging queues and exchanges is core to the capability of ensuring that timely notifications of critical events occur, while also supporting deeper analytics, processing, and reporting. This system of messaging queues and exchanges also enables the capability to manage DMAPPs and configurations on the sensor device hardware, as well as cloud based DMAPPs running directly on the analytics engine. These augmented analysis results can be sent back into different customer queues based on the customers' subscriptions to such models to provide added value to raw data. These queues can plug into a customer's system via a defined API that allows them to pull and manipulate their own data directly.

The steps according to one embodiment of the invention can occur as follows: (1) a plurality of remote sensor devices generate sensor data; (2) the remote sensor devices generate messages including the sensor data and/or data generated by DMAPP applications; (3) the remote sensor devices wirelessly transmit messages to a remote or cloud-based computing device or platform, wherein the cloud-based computing device may be a machine or virtual host associated with a customer; (4) the received messages are placed in one or more messaging queues associated with the customer; (5) the messaging queues provide messages to one or more connectors; (6) the connectors provide the messages and/or data derived from the messages to a customer platform for viewing and analysis. In further embodiments a broker can replicate critical data and alerts and sends that information directly to a customer platform. The data sent by the broker is defined by the customer and controlled by bindings on the broker. In further embodiments data may also be sent to a data lake for further processing and analysis. The messaging queue can also be used to send configuration changes and updated DMAPPs to sensor devices or other systems. The messaging queue can also respond to add or update DMAPPs from the DMAPP repository. In further embodiments, cloud-based DMAPPs can run on an analytics engine to enable deeper reports, analytics and alerting. These DMAPPs can augment analysis with data from multiple sensor devices and from external sources such as weather data, as one example. Critical alerts and data from DMAPPs can be queued directly to customer systems for immediate action. Deeper insights and reports can be delivered to the customer platform and made available via API or custom report dashboard inside the customer platform.

In further embodiments, DMAPPs can take data on the sensor device or in the cloud platform and perform additional analytics, customized for a specific application, such as, for example, the detection and analysis of agricultural disease. The term "data mesh" is used because these applications can combine disparate sources of data and perform analytics including, for example, machine learning and artificial intelligence algorithms. These applications can communicate with sources of information in the cloud platform and provide alerts directly to a customers' system.

In further embodiments DMAPPs can be managed centrally by a DMAPP repository. The DMAPP repository can manage updates to DMAPPs and conduct software compatibility checks. DMAPPs can be created in-house or by a third-party DMAPP developer. Prior to being hosted on the DMAPP repository, each DMAPP can be vetted. DMAPPs can be made available for anyone or restricted to a specific customer. DMAPPs can be provided free of charge, for a one-time charge, or on a subscription basis.

The system comprising the sensor device, cloud platform, and methods of the disclosed embodiments can monitor, record, and/or detect any suitable value including, but not limited to: physical limit or contact; revolution per minute; force; strain; soil level or erosion; water or humidity; atmospheric or vessel temperature; atmospheric or vessel pressure; gas (e.g., propane, natural gas, oxygen, carbon monoxide, carbon dioxide, nitrogen) presence, level, or pressure; voltage, current; position; velocity; acceleration; altitude; magnetic field strength; sound level or pressure; images, a series of images, or video.

The disclosed sensor devices can be very small and can include embedded cellular and/or satellite communications transmitters, receivers, or transceivers. These can be small single purpose sensor devices coupled with satellite and/or cellular communications to eliminate the need for deploying external networks for monitoring and/or having a human to track gas/propane usage each month for billing purposes, for example. These can also eliminate the need for someone to travel large distances in rural areas to monitor natural gas usage or propane tank levels for billing purposes.

An overview of the architecture of a system 100 according to an embodiment of the invention is depicted in FIG. 1. The system 100 comprises a plurality of sensor devices 110 associated with a customer, wherein each sensor device is configured to wirelessly transmit a message comprising sensor data to a plurality of messaging queues 130 configured to receive wirelessly transmitted messages and comprising sensor data from the plurality of sensor devices 110.

The plurality of messaging queues 130 further comprise a first messaging queue 130*a* associated with a customer, configured to receive wirelessly transmitted messages comprising sensor data from the plurality of sensor devices 110. The plurality of messaging queues 130 further comprise a second messaging queue 130*b* associated with a customer. The second messaging queue 130*b* can include data derived from one or more messages in the first messaging queue 130*a*. The second messaging queue 130*b* can also include messages and/or data replicated from the first messaging queue 130*a*. The second messaging queue 130*b* can also include messages, data, derived data, and/or replicated data from another customer's messaging queue.

The plurality of messaging queues 130 are further configured to transmit messages to one or more of a plurality of connectors 140, wherein the plurality of connectors are configured to receive the messages transmitted from one or more of the plurality of messaging queues 130. Each of the plurality of connectors 140 is configured to transmit messages to at least one of a plurality customer platforms 150, wherein the plurality of customer platforms 150 are configured to receive the messages transmitted by at least one of the one or more of connectors 140.

Figure 2:
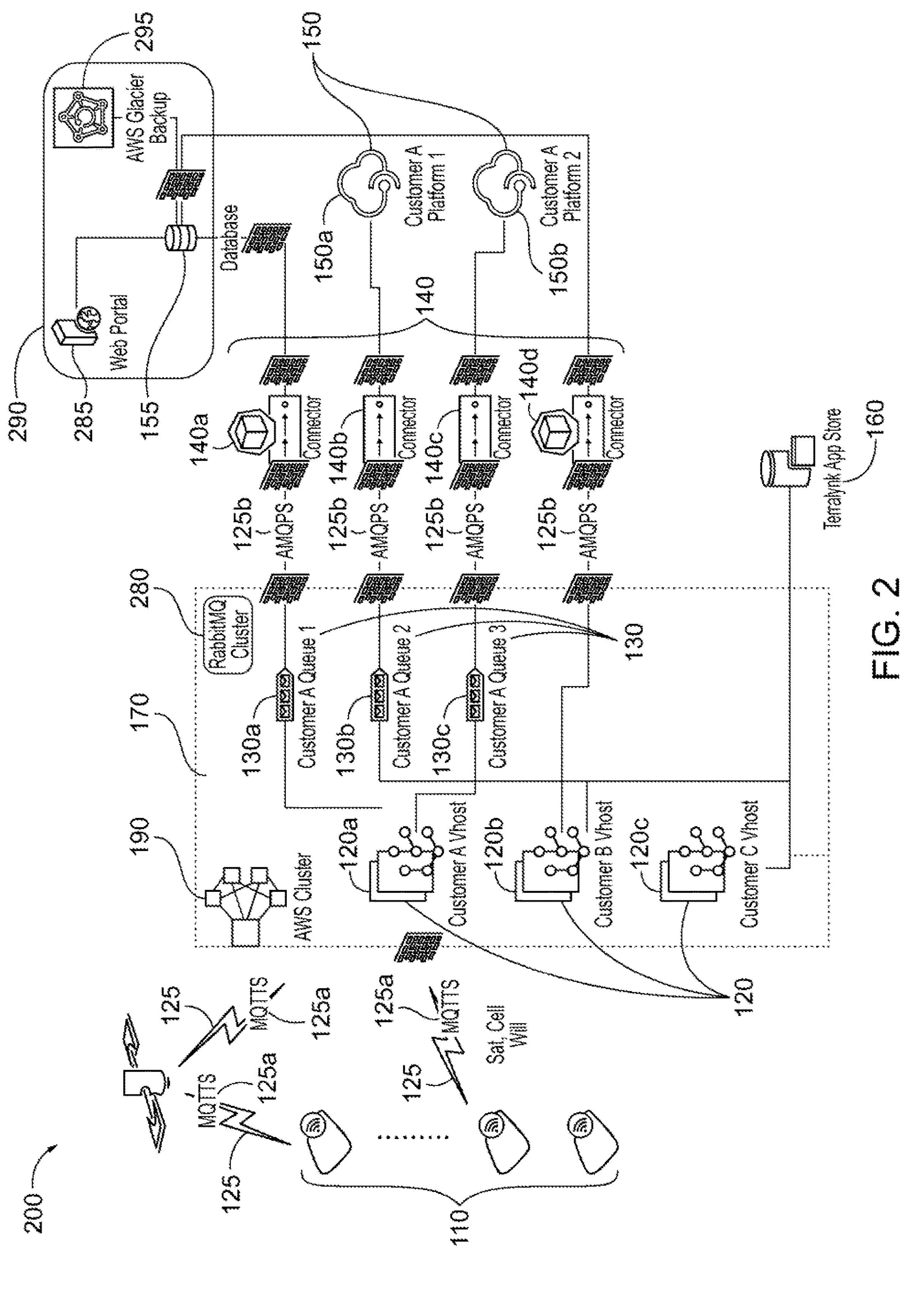
FIG. 2 is an overview of the architecture of a system according to an embodiment of the invention.

FIG. 2 discloses a system 200 like what is disclosed in FIG. 1 but with additional elements. The system 200 comprises a plurality of sensor devices 110 associated with a customer, with the sensor devices configured to wirelessly transmit a message comprising sensor data to a remote or cloud platform 170 utilizing a data transfer protocol 125 such as MQTTS 125*a*. The cloud platform 170 in one instance can comprise a RabbitMQ Cluster 280 running an Amazon AWS 190. The cloud platform 170 comprises a plurality of messaging queues 130. The cloud platform 170 further comprises a plurality of connectors 140 associated with a customer, configured to receive messages from at least one of the plurality of messaging queues 130 that can be transferred utilizing a data transfer protocol 125, such as AMQPS 125*b*. The plurality of connectors 140 associated with a customer comprise a first connector 140*a* associated with a customer configured receive a message from the first messaging queue 130*a*, wherein the first connector 140*a* is further configured to transmit messages to a cloud database 155 that is housed on a data lake 290. The cloud database 155 is configured to receive messages and/or data transmitted from the first connector 140*a*, wherein the cloud database 155 is further configured to back up to a long-term storage 295 and transmit data to a cloud management portal 285. The plurality of connectors 140 associated with a customer further comprise a second connector 140*b* associated with a customer, configured to transmit messages to a first customer platform 150*a* that is configured to receive messages transmitted from the second connector 140*b*. The plurality of connectors 140 further comprises a third connector 140*c* associated with a customer, configured to transmit messages to a second customer platform 150*b* that is configured to receive messages from the third connector 140*c*.

The system 200 further comprises an application repository 160 configured to provide one or more custom applications 120, also referred to herein as Data Mesh Applications (DMAPPs), that are installable on sensor devices 110 and/or on the cloud platform 170. The one or more custom applications 120 can comprise a first custom application 120*a*, a second custom application 120*b*, and a third custom application 120*c*. Each of the custom applications including the first custom application 120*a* can be configured to analyze sensor data to generate augmented sensor data and transmit the augmented sensor data in a second message to at least one of the plurality of messaging queues 130, which can be further configured to receive the second message containing the augmented sensor data from one or more custom applications 120. The first messaging queue 130*a* associated with a customer can be further configured to transmit the second message utilizing a data transfer protocol 125, such as AMQPS 125*b* to the first connector 140*a* associated with a customer, configured to receive the second message, wherein the first connector 140*a* associated with a customer is further configured to transmit the second message to a cloud database 155. The second messaging queue 130*b* associated with a customer is further configured to receive a second message from the first custom application 120*a* and transmit the second message utilizing a data transfer protocol 125, such as AMQPS 125*b* to the second connector 140*b* associated with a customer configured to receive the second message from the second messaging queue 130*b* associated with a customer, wherein the second connector 140*b* associated with a customer is further configured to generate a customer alert that is transmitted to the first customer platform 150*a*. The third messaging queue 130*c* associated with a customer is further configured to receive a second message from the first custom application 120*a* and transmit the second message utilizing a data transfer protocol 125, such as AMQPS 125*b* to the third connector 140*c* associated with a customer, configured to receive the second message, wherein the third connector 140*c* associated with a customer is further configured to generate a customer alert that is transmitted to the second customer platform 150*b*.

Figure 3:
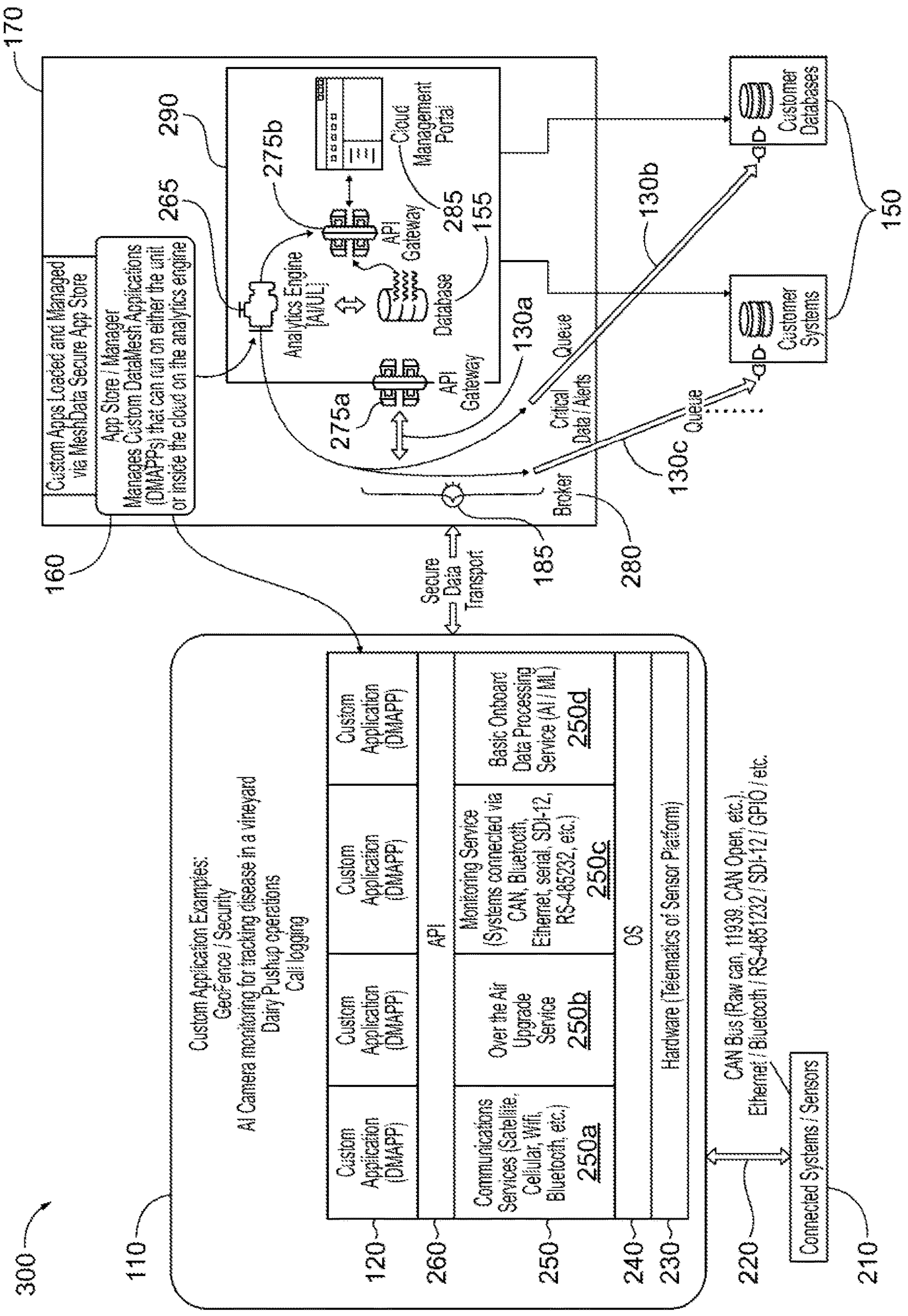
FIG. 3 is a slightly exploded view of the architecture of a system according to an embodiment of the invention.

The architecture of a system 300 implementing embodiments of the invention is shown in FIG. 3. A sensor device 110 transmits messages to messaging queues 130 in the cloud platform 170. The system 300 provides an application interface to quickly adapt to new scenarios and requirements, including robotics and the integration of artificial intelligence (AI) and machine learning (ML) capabilities throughout the system 300, including the sensor devices 110. The sensor device hardware 230 is configured to interface with external systems 210, such as external sensors, via an interface 220 such as CAN Bus, Ethernet, Bluetooth, RS-485/422/232, SDI-12, GPIO, or any other suitable interface method. Cellular connectivity can be controlled by a multi International Mobile Subscriber Identity (IMSI) SIM card that is configured to connect the hardware 230 to multiple networks, thereby maximizing the ability to interface via cellular.

The sensor device 110 further comprises an operating system (OS) 240 configured to provide an interface between the sensor firmware and external systems 210, such as external sensors, and management of services on a basic services layer 250. The basic services layer 250 comprises communications services 250*a* that are configured to communicate with the cloud platform 170 via satellite, cellular, Wi-Fi, or any other suitable method. The basic services layer 250 further comprises an over the air (OTA) software upgrade service 250*b* that is configured to wirelessly receive software upgrades transmitted from an application repository 160. The basic services layer 250 further comprises a monitoring service 250*c* configured to connect to external systems 210 via CAN, Bluetooth, Ethernet, serial, SDI-12 RDS-485/232 or any other suitable method. The basic services layer 250 further comprises an onboard data processing service 250*d*, such as artificial intelligence (AI) or machine learning (ML).

The sensor device 110 further comprises an API 260 configured to provide a specific, controlled interface that enables one or more custom applications 120 to run and to interact with services on the basic services layer 250 to retrieve sensor data, transmit sensor data, and process sensor data at the edge of the hardware 230 of the sensor device 110. The custom applications 120 or DMAPPS are configured to be customizable to fulfill a specific purpose for a customer. The custom applications 120 can be further configured to enable the sensor device 110 to fulfill multiple specific purposes at scale.

The sensor device 110 is configured to transmit sensor data, including data from any custom applications 120 to the cloud platform 170 via satellite, cellular, Wi-Fi or other suitable methods. The cloud platform 170 further comprises a broker 280 that is configured to replicate data, generate alerts, and transmit data and alerts. The broker 280 can further comprise one or more broker bindings 185 configured to determine what data and alerts to transmit based upon predefined customer preferences.

The broker 280 can further be configured to transmit data and alerts to a plurality of messaging queues 130, for example to a first messaging queue 130*a* associated with a customer that is configured to receive data and alerts from the broker 280, wherein the first messaging queue 130*a* associated with a customer is further configured to transmit data and alerts to a first API gateway 275*a* contained on the data lake 290 that is configured to receive data and alerts transmitted from the plurality of messaging queues 130, for example a first messaging queue 130*a* associated with a customer, wherein the data lake 290 is further configured to process and analyze the data and alerts. The first messaging queue 130*a* associated with a customer is further configured to receive one or more custom applications 120 and custom application updates from the application repository 160, wherein the first messaging queue 130*a* associated with a customer is further configured to transmit custom device application configuration data and custom application updates to the sensor device 110 associated with a customer.

The data lake 290 can comprise an analytics engine 265 configured to run one or more custom applications 120 on the cloud platform 170, wherein the analytics engine 265 enables one or more custom applications 120 to create more robust reports and improve analytics and reporting. The custom applications 120 can be further configured to augment analysis utilizing data from external sources, such as weather data. The data and alerts can be transmitted from the custom applications 120 running on the cloud platform 170 to the plurality of messaging queues 130, for example the second messaging queue 130*b* associated with a customer and the third messaging queue 130*c* associated with a customer configured to receive data and alerts from the one or more custom applications 120 running on the cloud platform 170, wherein the second messaging queue 130*b* associated with a customer and the third messaging queue 130*c* associated with a customer are further configured to transmit the data and alerts to one or more customer systems 150 to enable immediate customer action. The more robust reports and improved analytics and reporting generated by the one or more custom applications 120 that are enabled by the analytics engine 265 are transmitted to a second API gateway 275*b* that is configured to receive the more robust reports and improved analytics and reporting from the one or more custom applications 120 running on the cloud platform 170. The second API gateway 275*b* is further configured to transmit the more robust reports and improved analytics and reporting to a cloud management portal 285 configured to receive the more robust reports and improved analytics and reporting from the second API gateway 275*b*.

Figure 4:
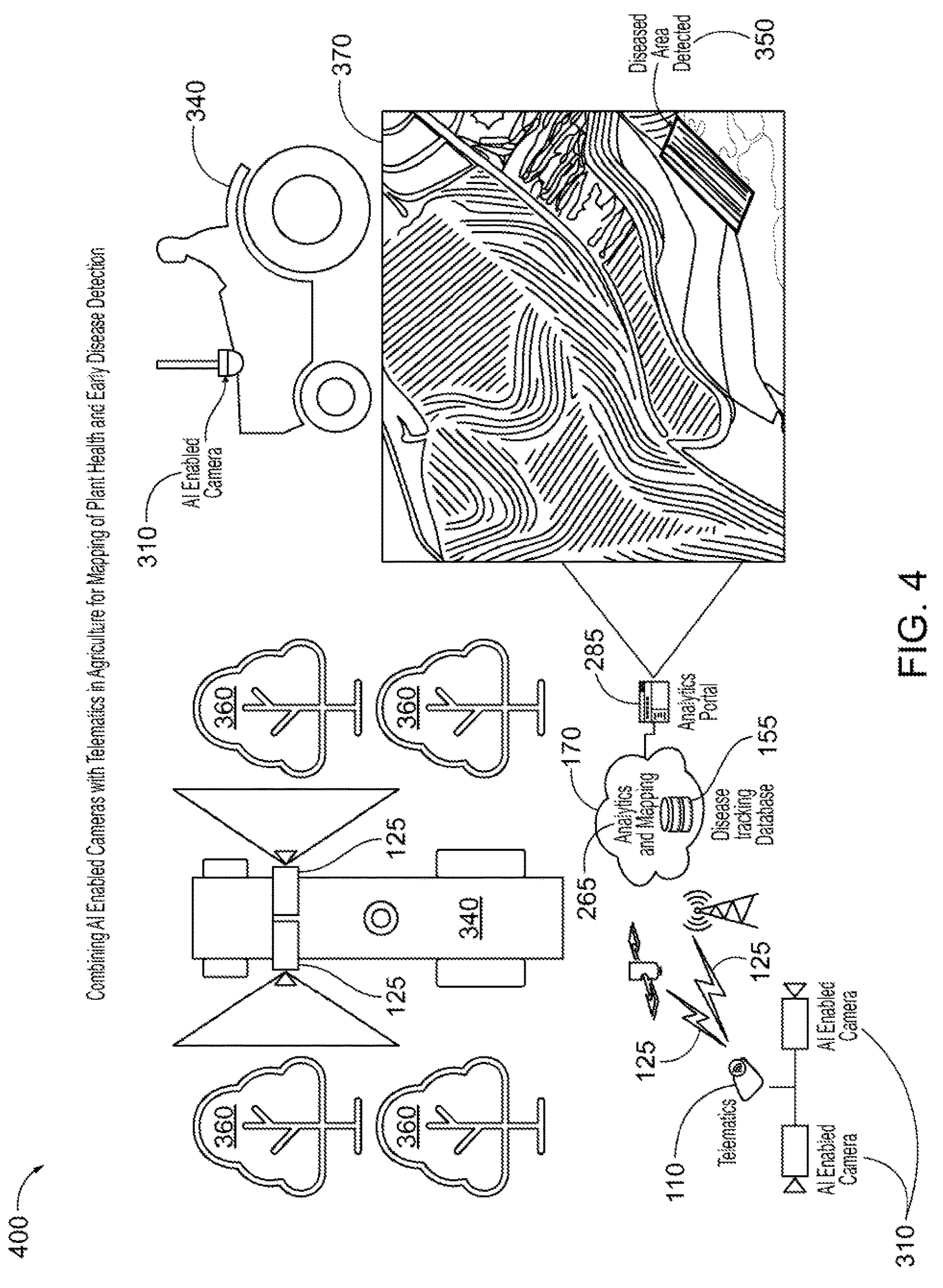
FIG. 4 is a depiction of AI enabled cameras mounted to an agricultural implement that is combined with a system according to an embodiment of the invention.

FIG. 4 is a depiction of the system 400 made in accordance with the embodiments disclosed in FIGS. 1-3 used in combination with an AI enabled camera 310 for use in agricultural mapping of plant health for early disease detection. The system allows one or more of the plurality of sensor devices 110 to be used in other applications such as, for example, in combination with one or more Artificial Intelligence (AI) enabled cameras 310. In another embodiment, the one or more AI enabled cameras 310 capable of detecting and mapping disease in a field, orchard, or vineyard can be mounted onto an agricultural implement 340, such as a tractor. The one or more AI enabled cameras 310 can detect plant health by capturing images of flora 360. The images of flora 360 are transmitted to at least one of the plurality of sensor devices 110 that are configured to receive images from the AI enabled cameras 310. The sensor devices 110 are further configured to transmit the images of flora 360 via cellular, satellite, Wi-Fi or similar means of telecommunication to the cloud platform 170, wherein the cloud platform 170 further comprises a database 155 configured to store images and other data for tracking disease progression and an analytics engine 265 configured to aid in the mapping of disease progression. The images and other data from the database 155 are configured to be transmitted to the analytics engine 265, which is further configured to receive data and images from the database 155. The database 155 is further configured to transmit the data and images to a second API gateway 275*b* that is configured to receive data and images from the database 155. The second API gateway 275*b* is further configured to transmit data and images to a cloud management portal 285 configured to receive data and images from the second API gateway 275*b*, wherein the cloud management portal provides a customer with information about an agricultural area 370 and enables a customer to detect a diseased area 350. The system 300 provides the ability to easily combine data from multiple AI enabled camera systems to track the progression of disease across large regions, such as states, countries, or continents.

One of skill in the art will understand that the features of devices and systems disclosed herein, as well as of the steps of the disclosed methods, may be used together to create further embodiments. While the invention has been described in detail in connection with specific embodiments, the invention is not limited to the above-disclosed embodiments. Rather, a person skilled in the art will understand that the invention can be modified to incorporate any number of variations, alternations, substitutions, or equivalent arrangements not heretofore described, but which are commensurate with the spirit and scope of the invention. Specific embodiments should be taken as exemplary and not limiting.

We claim:

1. A system comprising:

a. a plurality of sensor devices associated with a customer, wherein each of the plurality of sensor devices is configured to wirelessly transmit a first message comprising sensor data;

b. a plurality of messaging queues comprising:

i. a first messaging queue associated with the customer and configured to receive a plurality of the first messages from the plurality of sensor devices; and ii. a second messaging queue associated with the customer and including data derived from one or more of the plurality of the first messages in the first messaging queue;

c. a plurality of connectors associated with the customer, wherein each connector is configured to receive messages from one of the plurality of messaging queues; and d. a plurality of customer platforms associated with the customer, and wherein each customer platform is capable of receiving sensor data from one of the plurality of connectors.

2. The system of claim 1, wherein each sensor device comprises a processor, a memory, and a dual-band cellular-satellite chipset.

3. The system of claim 1, wherein each sensor device is configured to be updated over the air.

4. The system of claim 1, further comprising an application repository configured to provide a plurality of custom applications that are remotely installable on the plurality of sensor devices.

5. The system of claim 4, wherein each of the plurality of sensor devices is configured to wirelessly receive and install a custom application from the application repository in a predetermined memory space.

6. The system of claim 5, wherein the custom application analyzes stored sensor data to generate augmented sensor data.

7. The system of claim 6, wherein the augmented sensor data is included in the first message.

8. The system of claim 7, wherein the first message is used to generate a customer alert that is transmitted to a customer platform.

9. The system of claim 1, further comprising an application repository configured to provide a plurality of custom applications that are installable on a cloud computing device.

10. The system of claim 9, wherein the custom application analyzes sensor data to generate augmented sensor data.

11. The system of claim 10, wherein the augmented sensor data is included in a second-message that is transmitted to one of the plurality of messaging queues.

12. The system of claim 11, wherein the second message is used to generate a customer alert that is transmitted to a customer platform.

13. The system of claim 1, wherein each of the plurality of messaging queues is hosted on a virtual machine.

14. The system of claim 13, wherein the virtual machine is in communication with an application repository configured to provide a plurality of custom applications that are remotely installable on at least one of the plurality of sensor devices and a cloud computing device.

15. The system of claim 1, wherein each of the plurality of sensor devices comprises an analog to digital converter.

16. The system of claim 1, wherein each of the plurality of sensor devices is configured for continuous power optimization using an analog to digital converter to read battery power levels.

17. The system of claim 1, further comprising a stored permission that allows the customer to receive messages or data derived from messages associated with one or more of other customers.

18. The system of claim 1, wherein data stored on each of the plurality of sensor devices is encrypted using a key derived from one or more hardware identifiers from each of the plurality of sensor devices.

19. The system of claim 1, further comprising a third messaging queue associated with the customer and including data replicated from the first messaging queue.

20. A system comprising:

a. a plurality of sensor devices associated with a customer, wherein each of the plurality of sensor devices comprises a processor, a memory, and a wireless transceiver, and wherein the processor is configured to:
   i. wirelessly transmit a first message comprising sensor data;
   ii. wirelessly receive and install a custom application in a predetermined memory space; and
   iii. run the custom application to analyze stored sensor data and generate augmented sensor data for inclusion in a second message;

b. an application repository configured to wirelessly provide the custom application to each of the plurality of sensor devices based on a first customer permission;

c. a plurality of messaging queues comprising:
   i. a first messaging queue associated with the customer and configured to receive messages from the plurality of sensor devices; and
   ii. a second messaging queue associated with the customer and including data derived from one or more messages in the first messaging queue;

d. a plurality of connectors associated with the customer, wherein each connector is configured to receive messages from one of the plurality of messaging queues; and a plurality of customer platforms associated with the customer, and wherein each customer platform is capable of receiving data from one of the plurality of connectors.

* * * * *